(12) United States Patent
Sanigepalli et al.

(10) Patent No.: US 12,715,623 B1
(45) Date of Patent: Aug. 25, 2026

(54) SYSTEM AND METHOD OF UNLOADING A PAYLOAD FROM AN AEROSPACE LANDING VEHICLE

(71) Applicant: Honeybee Robotics, LLC, Longmont, CO (US)

(72) Inventors: Vishnu Sanigepalli, Los Angeles, CA (US); Brian David Vogel, Simi Valley, CA (US); Justin David Lawrence, Culver City, CA (US); Trenton Mathison, Longmont, CO (US); Dara Sabahi, Longmont, CO (US); Dean Bergman, Altadena, CA (US); Devin Paul Anderson, Yucaipa, CA (US); Kris Zacny, Altadena, CA (US); Joshua W. Erlich, Aurora, CO (US)

(73) Assignee: Honeybee Robotics, LLC, Longmont, CO (US)

( * ) Notice: Subject to any disclaimer, the term of this patent is extended or adjusted under 35 U.S.C. 154(b) by 0 days.

(21) Appl. No.: 19/097,329

(22) Filed: Apr. 1, 2025

(51) Int. Cl.
*B64G 4/00* (2006.01)
*B25J 9/04* (2006.01)
*B25J 9/10* (2006.01)

(52) U.S. Cl.
CPC .................................... *B64G 4/00* (2013.01); *B25J 9/04* (2013.01); *B25J 9/104* (2013.01)

(58) Field of Classification Search
CPC .......... B64G 1/1071; B64G 4/00; B64G 5/00; B64C 1/22; B63B 27/16
See application file for complete search history.

(56) References Cited

U.S. PATENT DOCUMENTS

| | | | | |
|---|---|---|---|---|
| 4,600,355 | A * | 7/1986 | Johnson | B25J 9/08 414/730 |
| 4,750,691 | A * | 6/1988 | Hollrock | B64C 1/22 244/137.1 |
| 5,710,870 | A * | 1/1998 | Ohm | B25J 19/02 700/262 |
| 9,878,806 | B2 * | 1/2018 | Helmer | B64G 1/66 |
| 10,611,036 | B2 * | 4/2020 | Bidram | G05D 1/024 |
| 10,745,219 | B2 * | 8/2020 | Bidram | B65G 67/24 |
| 10,884,426 | B2 * | 1/2021 | Bidram | B60P 1/48 |
| 11,999,513 | B2 * | 6/2024 | Uzo-Okoro | B64G 1/10 |

(Continued)

FOREIGN PATENT DOCUMENTS

| | | |
|---|---|---|
| CN | 102700729 A | 10/2012 |
| CN | 110239966 A | 9/2019 |

(Continued)

OTHER PUBLICATIONS

Wikipedia, Davit. Retrieved online at: https://en.wikipedia.org/wiki/Davit. 4 pages, Mar. 27, 2025.

*Primary Examiner* — Joseph W Sanderson
(74) *Attorney, Agent, or Firm* — McCarter & English, LLP; Dave S. Christensen

(57) ABSTRACT

A cargo unloading system and an aerospace landing vehicle is provided. The unloading system includes a carriage configured to couple to the aerospace landing vehicle. At least one main arm is configured to be rotationally coupled to the carriage. A linear-slide arm is slidably coupled to a first end of the at least one main arm. An end effector is operably coupled to a second end of the linear-slide arm. A bi-directional rotation mechanism is operably coupled between the carriage and the first end.

18 Claims, 17 Drawing Sheets

(56) References Cited

U.S. PATENT DOCUMENTS

| | | | | |
|---|---|---|---|---|
| 2016/0264264 | A1* | 9/2016 | Helmer | B64G 1/66 |
| 2019/0031297 | A1* | 1/2019 | Looijen | B63B 23/08 |
| 2019/0168394 | A1* | 6/2019 | Bidram | B60P 1/48 |
| 2019/0248024 | A1* | 8/2019 | Bidram | G05D 1/0276 |
| 2020/0102164 | A1* | 4/2020 | Bidram | B25J 9/104 |
| 2022/0144460 | A1* | 5/2022 | Uzo-Okoro | B64G 1/24 |

FOREIGN PATENT DOCUMENTS

| | | | | | |
|---|---|---|---|---|---|
| CN | 111137473 | A | * | 5/2020 | G01N 1/08 |
| CN | 116280284 | A | * | 6/2023 | B64G 1/645 |
| KR | 10-2007-0113934 | A | | 11/2007 | |
| KR | 20180044745 | A | * | 5/2018 | B62B 3/10 |
| RU | 2779426 | | | 9/2022 | |
| WO | WO-2019021036 | A1 | * | 1/2019 | B64G 5/00 |

* cited by examiner

SYSTEM AND METHOD OF UNLOADING A PAYLOAD FROM AN AEROSPACE LANDING VEHICLE

BACKGROUND OF THE DISCLOSURE

The subject matter disclosed herein relates to a system for unloading a payload from an aerospace vehicle, such as an unloading system for a lunar landing craft.

Aerospace or spacecraft landing vehicles are commonly used to deliver a payload or cargo to a terrestrial or extra-terrestrial surface. These vehicles use a propulsion system, commonly referred to as thrusters, to slow the descent of the vehicle onto the landing surface. Since the thrusters are located on the bottom of the vehicle, the vehicles tend to be tall relative to their width (e.g. having a large Length/Diameter ratio). In some cases this is due to the landing vehicle being transported from Earth within a rocket casing having width constraints.

As a result, these vehicles often store their cargo on a platform of deck vertically above the thrusters. As the desire for larger and correspondingly heavier payloads increases, logistical issues are created in unloading the cargo once the vehicle has reached the landing surface. It is anticipated that lunar missions in the near future will include payloads weighing up to 19 metric tons that are stored at least 10 meters from the landing surface.

During the Apollo program, cargo such as the Lunar Roving Vehicle (LRV) was transported on the Lunar Module by storing it on the side of the Lunar Module. Since the LRV was relatively close to the lunar surface, it could be manually unloaded with a system of pulleys and braked reels using ropes and cloth tapes. The LRV was essentially unfolded out of the Lunar Module directly onto the surface. It should be appreciated that the landing surface had to be carefully chosen since the LRV could only be unloaded from one side. It should further be appreciated that due to the cargo size and weight parameters of modern lunar missions, the manually operated system used during the Apollo missions would not be suitable.

While existing aerospace vehicle cargo unloading systems are suitable for their intended purposes the need for improvement remains, particularly in providing an having the features described herein.

BRIEF DESCRIPTION OF THE DISCLOSURE

According to one aspect of the disclosure a cargo unloading system for an aerospace landing vehicle is provided. The system includes a carriage configured to couple to the aerospace landing vehicle. At least one main arm is configured to be rotationally coupled to the carriage. A linear-slide arm is slidably coupled to a first end of the at least one main arm. An end effector is operably coupled to a second end of the linear-slide arm. A bi-directional rotation mechanism is operably coupled between the carriage and the first end.

In addition to one or more of the features described herein, or as an alternative, further embodiments of the bidirectional rotation mechanism may include a first cable operably coupled to the first end and a second cable operably coupled to the first end. At least one winch motor is operably coupled to at least one of the first cable or second cable, wherein the bidirectional rotation mechanism is configured to cause the main arm to pivot in response to the at least one winch motor pulling on one of the first cable or second cable.

In addition to one or more of the features described herein, or as an alternative, further embodiments of the system may include a slide actuation mechanism coupled between the at least one main arm and the linear-slide arm.

In addition to one or more of the features described herein, or as an alternative, further embodiments of the slide actuation mechanism includes a third cable having a third end coupled to the main arm at the first end and a fourth end coupled to the main arm at a position offset from the first end. A capstan is coupled to the main arm and to the third cable. The third cable slidingly engages, and is operably coupled to, the linear-slide arm to bidirectionally translate the linear-slide arm in response to operation of the capstan.

In addition to one or more of the features described herein, or as an alternative, further embodiments of the system may include an umbilical cable having a fifth end operably coupled to the aerospace landing vehicle and having an opposing sixth end configured to couple with a cargo, the umbilical cable being operably coupled to the linear slide arm.

In addition to one or more of the features described herein, or as an alternative, further embodiments of the system may include the umbilical cable being configured to transfer power and communications signals.

In addition to one or more of the features described herein, or as an alternative, further embodiments of the system may include the umbilical cable being further configured to transfer a fluid.

In addition to one or more of the features described herein, or as an alternative, further embodiments of the system may include the end effector being configured to releasably couple to a cargo arranged on the aerospace landing vehicle.

In addition to one or more of the features described herein, or as an alternative, further embodiments of the system may include a pallet adapter coupled between the carriage and the aerospace landing vehicle.

In addition to one or more of the features described herein, or as an alternative, further embodiments of the system may include the pallet adapter being releasably coupled to the aerospace landing vehicle.

According to another aspect of the disclosure, an aerospace landing vehicle having cargo is provided. The aerospace vehicle landing vehicle includes a fuselage having a thruster disposed on a first end. A payload deck is disposed on a second end opposite the first end. A carriage is configured to couple to the payload deck. At least one main arm is configured to be rotationally coupled to the carriage, the at least one main arm being in a first position when coupled to the cargo. A linear-slide arm is slidably coupled to a first end of the at least one main arm, the linear slide arm being in a retracted position when the cargo is disposed on the payload deck. An end effector is operably coupled to a second end of the linear-slide arm, the end effector being releasably coupled to the cargo. A bi-directional rotation mechanism is operably coupled between the carriage and the first end.

In addition to one or more of the features described herein, or as an alternative, further embodiments of the aerospace landing vehicle may include a slide actuation mechanism coupled between the at least one main arm and the linear-slide arm.

In addition to one or more of the features described herein, or as an alternative, further embodiments of the aerospace landing vehicle may include a controller operably coupled to the bi-directional rotation mechanism and the slide actuation mechanism.

In addition to one or more of the features described herein, or as an alternative, further embodiments of the aerospace landing vehicle may include the controller being operable to cause a selective rotation the main arm in a first rotational direction or a second rotational direction in response to an input.

In addition to one or more of the features described herein, or as an alternative, further embodiments of the aerospace landing vehicle may include the controller being further operable to cause a movement of the linear-slide arm from a retracted position to a first position prior to rotating the main arm.

In addition to one or more of the features described herein, or as an alternative, further embodiments of the aerospace landing vehicle may include the controller being further operable to cause the rotation of the main arm in the selected first rotational direction or second rotational direction to a second position where the cargo is resting on a landing surface.

In addition to one or more of the features described herein, or as an alternative, further embodiments of the aerospace landing vehicle may include the controller being further operable to cause decoupling of the end effector from the cargo when in the second position, and further cause rotation of the main arm to a third position.

In addition to one or more of the features described herein, or as an alternative, further embodiments of the aerospace landing vehicle may include the fuselage further having a locking member, and the controller is further operable to couple the end effector to the locking member when in the third position.

In addition to one or more of the features described herein, or as an alternative, further embodiments of the aerospace landing vehicle may include a pallet adapter coupled between the carriage and the payload deck, wherein the pallet adapter is releasably coupled to the payload deck.

In addition to one or more of the features described herein, or as an alternative, further embodiments of the aerospace landing vehicle may include the controller is further operable to: cause the aerospace landing vehicle to launch from the landing surface; cause the rotation of the at least one main arm to the first position after launching from the landing surface; cause the decoupling of the pallet adapter from the payload deck in response to the aerospace landing vehicle being at a predetermined altitude or orientation; and cause the separation of the pallet adapter from the aerospace vehicle.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

Embodiments of the present disclosure provide for a cargo unloading system for an aerospace landing vehicle having a cargo stored vertically offset from a landing surface. Further embodiments of the present disclosure provide for a cargo unloading system that is bi-directional allowing the cargo to be unloaded from two sides of the aerospace landing vehicle. Still further embodiments of the present disclosure provide for a cargo unloading system that can move a cargo rotationally and linearly during an unloading operation. Still further embodiments of the present disclosure provide for a cargo unloading system that is stowable for departure from the landing surface and selectively separable from the aerospace landing vehicle.

Figure 1:
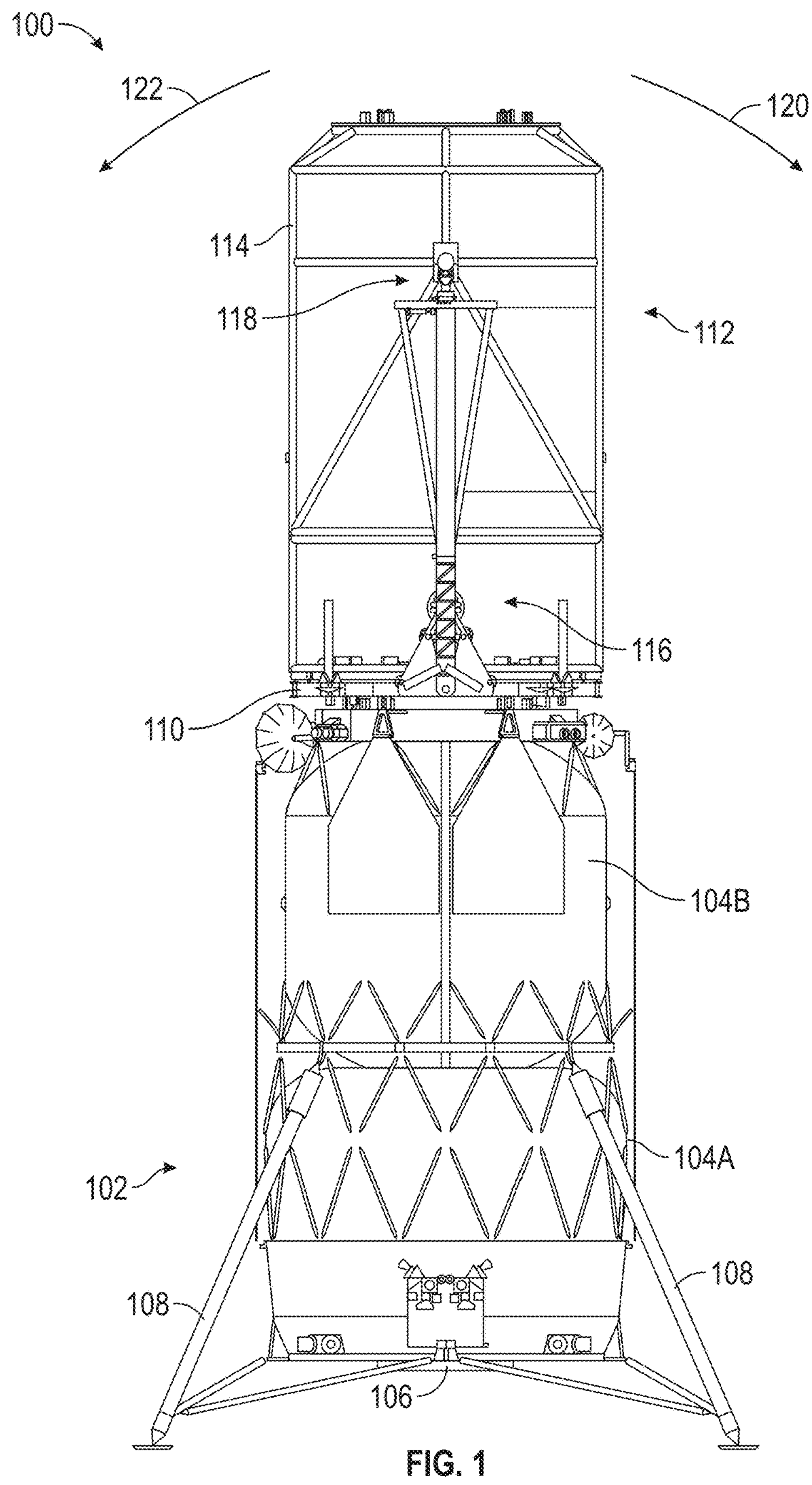
FIG. 1 is a side view of an aerospace landing vehicle having a cargo unloading system in accordance with an embodiment.

Referring now to FIG. 1 an embodiment is shown of an aerospace landing vehicle 100. In an embodiment, the vehicle 100 includes a fuselage 102 that may be comprised of a plurality of segments 104A, 104B for example. The vehicle 100 may include one or more propulsion devices 106, such as thrusters for example, that allow the vehicle 100 to descend onto a landing surface at a predetermined rate. In some embodiments, the propulsion devices further facilitate launching of the vehicle 100 from the landing surface, such as into orbit for example. In an embodiment, the vehicle 100 includes a plurality of struts 108 that extend angularly from the fuselage 102 to provide stability to the vehicle 100 when the vehicle is resting on a surface.

In an embodiment, the segments 104A, 104B are serially arranged or stacked to define a relatively long and narrow structure (e.g. high L/D ratio). In this embodiment, a cargo or payload deck 110 may be disposed on an end opposite the struts 108. In some embodiments, the payload deck 110 may be 10 meters or higher above the ground. To facilitate removal of the cargo, an unloading assembly 112 is provided that allows the cargo to be removed from the payload deck 110 and selectively placed on the landing surface on one of two sides of the fuselage 102. In other words, the unloading assembly 112 may be operated bi-directionally. It should be appreciated that while embodiments herein refer to the assembly 112 as an "unloading" assembly, the mechanism may equally be used in reverse to load cargo from the landing surface onto the payload deck 110.

As will be discussed in more detail below, the unloading assembly 112 includes a cage or other structure 114 that is used to hold and constrain the cargo during transportation (e.g. from Earth to the Moon). In some embodiments, the unloading assembly 112 may be selectively coupled or uncoupled from the payload deck 110. In some embodiments, the structure 114 may be integrated into the cargo itself (e.g. a habitat module for astronauts to reside). The structure 114 is coupled to the payload deck by a bidirectional rotation mechanism 116 that includes a linear-slide mechanism 118. As will be discussed in more detail herein, the linear-slide mechanism 118 lifts the structure 114 from the payload deck 110 and also extends the structure 114 away from the centerline of the vehicle 100 while the bidirectional rotation mechanism 116 rotates in one of a first direction 120 or a second direction 122. In an embodiment, the linear-slide mechanism 118 may move radially while the bidirectional rotation mechanism 116 rotates to provide a desired clearance between the structure 114 and the fuselage 102 and struts 108.

Referring now to FIG. 2A-FIG. 2E, an embodiment is shown of an unloading assembly 212. In an embodiment, the unloading assembly 212 includes an first arm assembly 224A and a second arm assembly 224B. It should be appreciated that while the operation of unloading assembly 212 is described with respect to the first arm assembly 224A, this is for conciseness purposes and the second arm assembly 224B may be constructed and operated in an identical manner. In an embodiment, the unloading assembly 212 only has a single arm assembly.

In an embodiment, the unloading assembly 212 includes an optional pallet adapter 226 that is configured to couple with the payload deck 110. The pallet adapter 226 may be removably coupled to the payload deck 110. This provides advantages in allowing the cargo and unloading assembly 212 to be packaged together for transportation from an initial location (e.g. Earth) to an intermediate location (e.g. a Lunar space station or gateway) where the cargo and unloading assembly are mounted to the vehicle 100. As discussed in more detail herein, once the cargo is unloaded at a landing surface, the unloading assembly may be jettisoned to allow the vehicle 100 to receive a new cargo/unloading assembly. In other embodiments, the unloading assembly 212 is mounted (fixed) directly to the payload deck 110.

Coupled to the pallet adapter 226 (or alternatively directly to the payload deck) is a carriage 228. As shown in FIG. 2F, the carriage 228 includes a plurality of pulleys 236, 238 and a pair of cable spools 240 and at least one winch motor 242 that engages a pair of belay cables. The belay cables extend from the carriage and couple a cross-arm 232 of a main arm 230 (see FIG. 5A). By pulling one of the cables and belaying the other/opposing cable, the main arm 230 may be rotated in a controlled manner in either direction about a pivot 234. It should be appreciated that additional pulleys or rollers may be provided to guide the belay cables and avoid sharp edges, such as the pulley 243 (FIG. 2G).

Figure 2A:
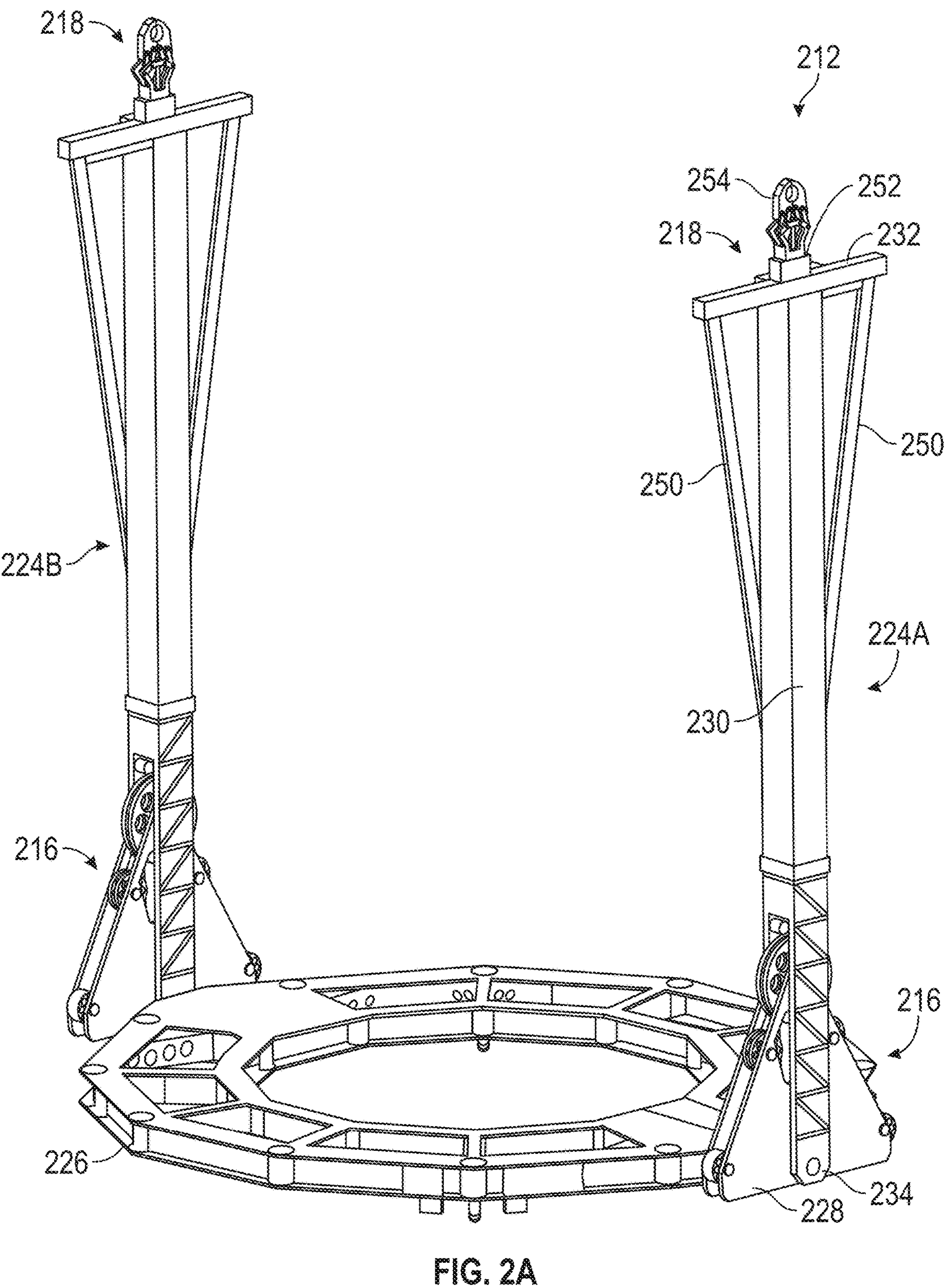
FIG. 2A is a perspective view of a cargo unloading system in accordance with an embodiment.
Figure 2B:
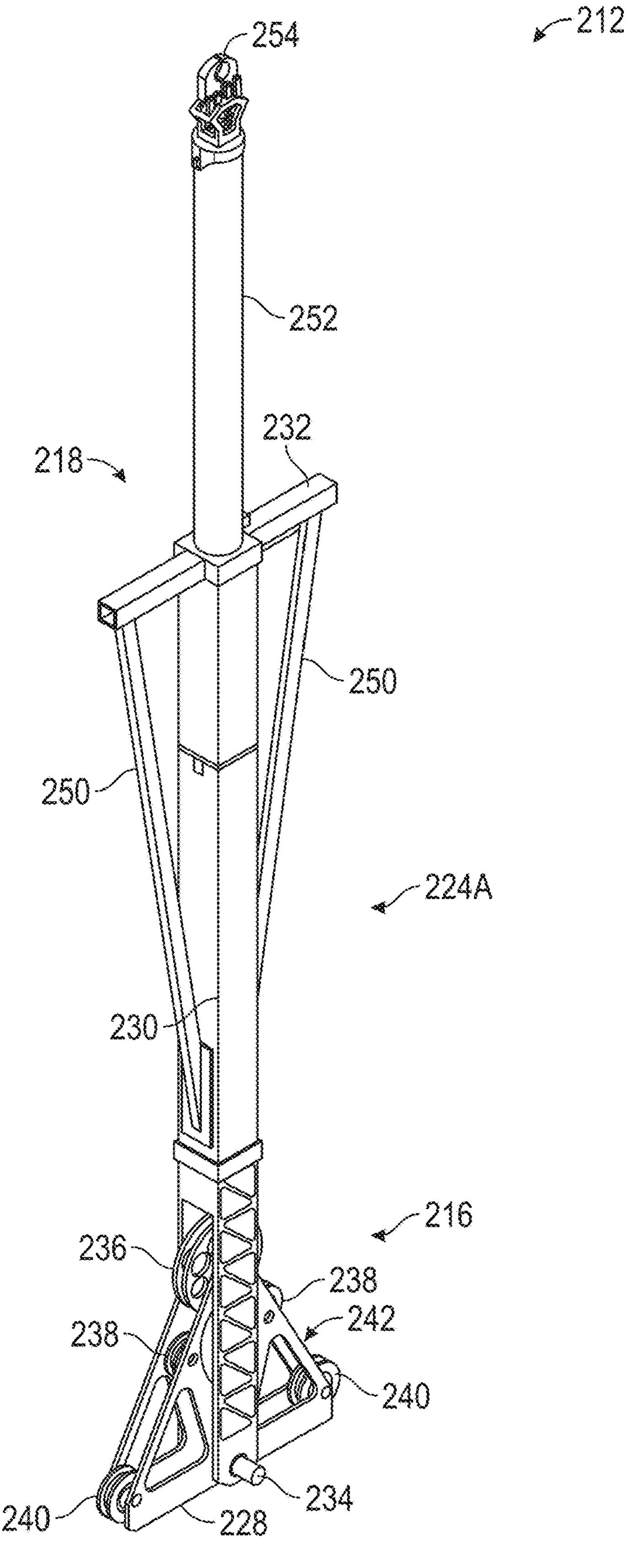
FIG. 2B is a perspective view of an arm assembly for the cargo unloading system of FIG. 2A.
Figure 2C:
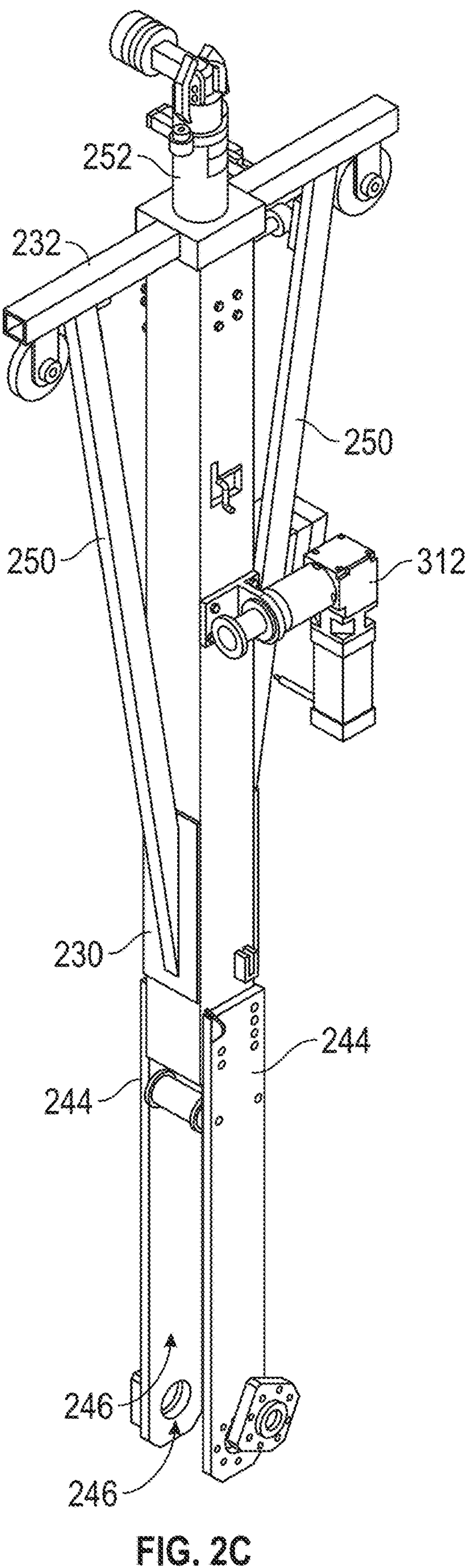
FIG. 2C is a perspective view of an arm assembly for the cargo unloading system of FIG. 2A in accordance with an embodiment.
Figure 2D:
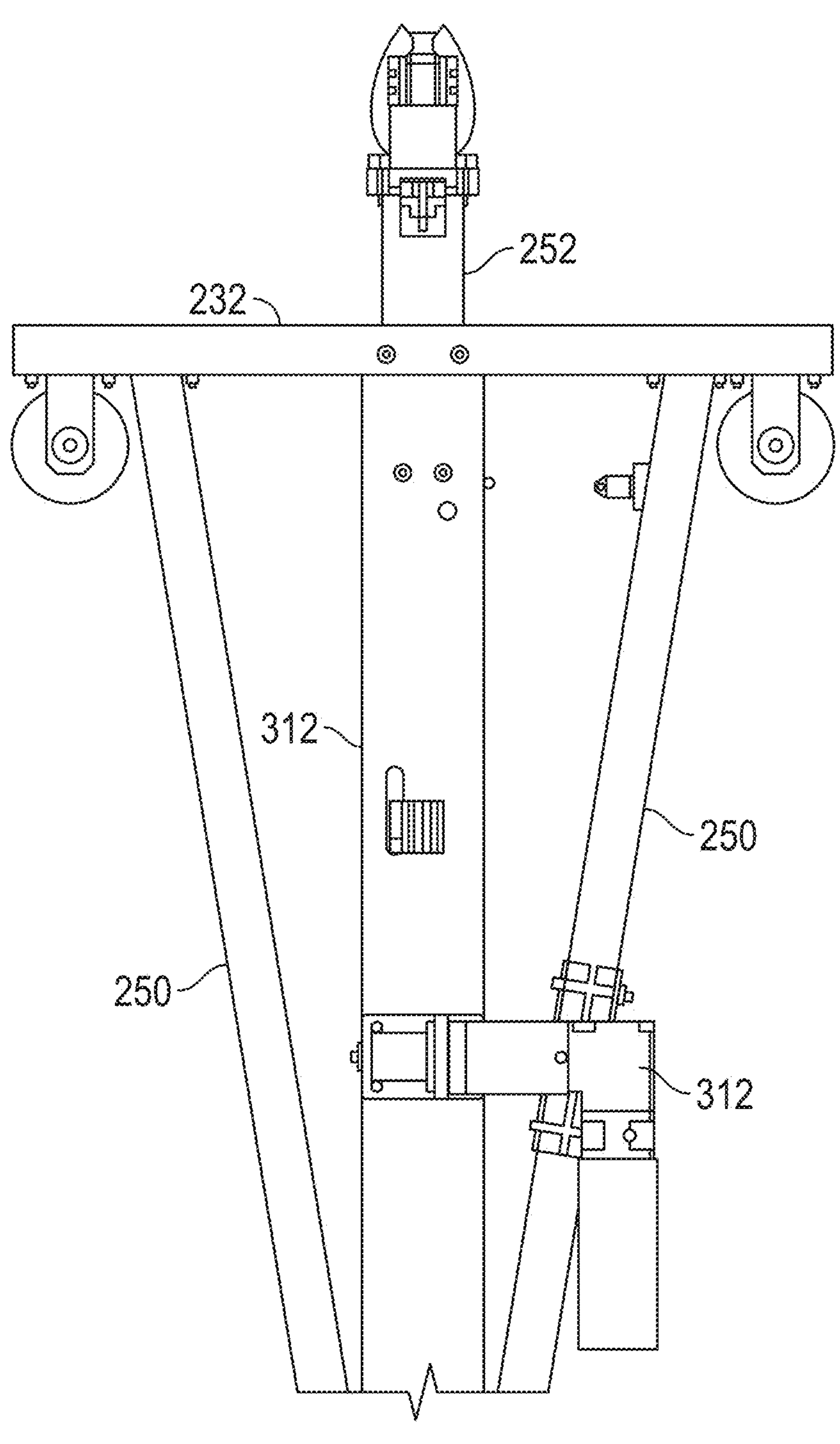
FIG. 2D is a side view of a portion of the arm assembly of FIG. 2C.
Figure 2E:
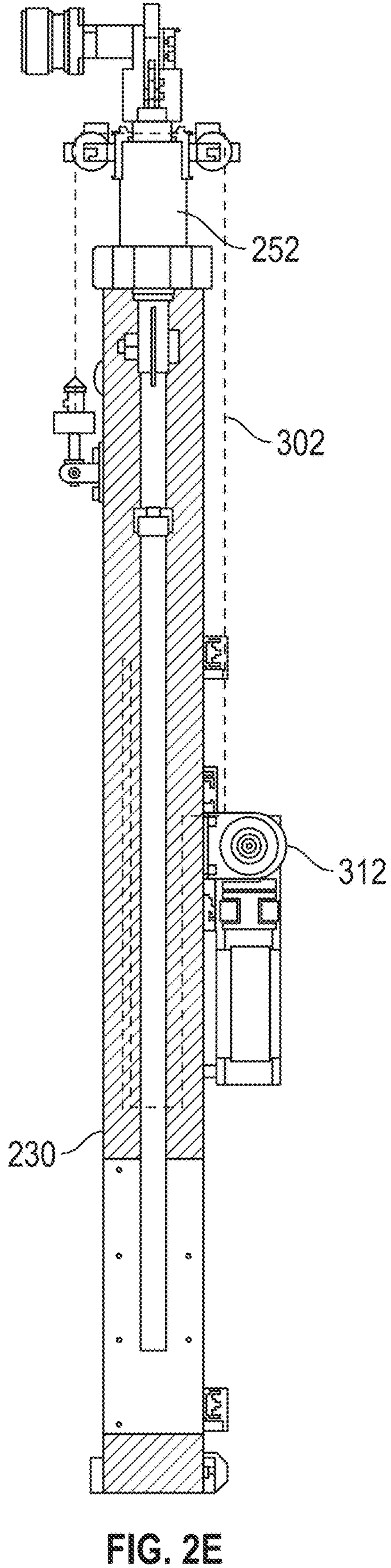
FIG. 2E is an end view of the arm assembly of FIG. 2C.
Figure 2F:
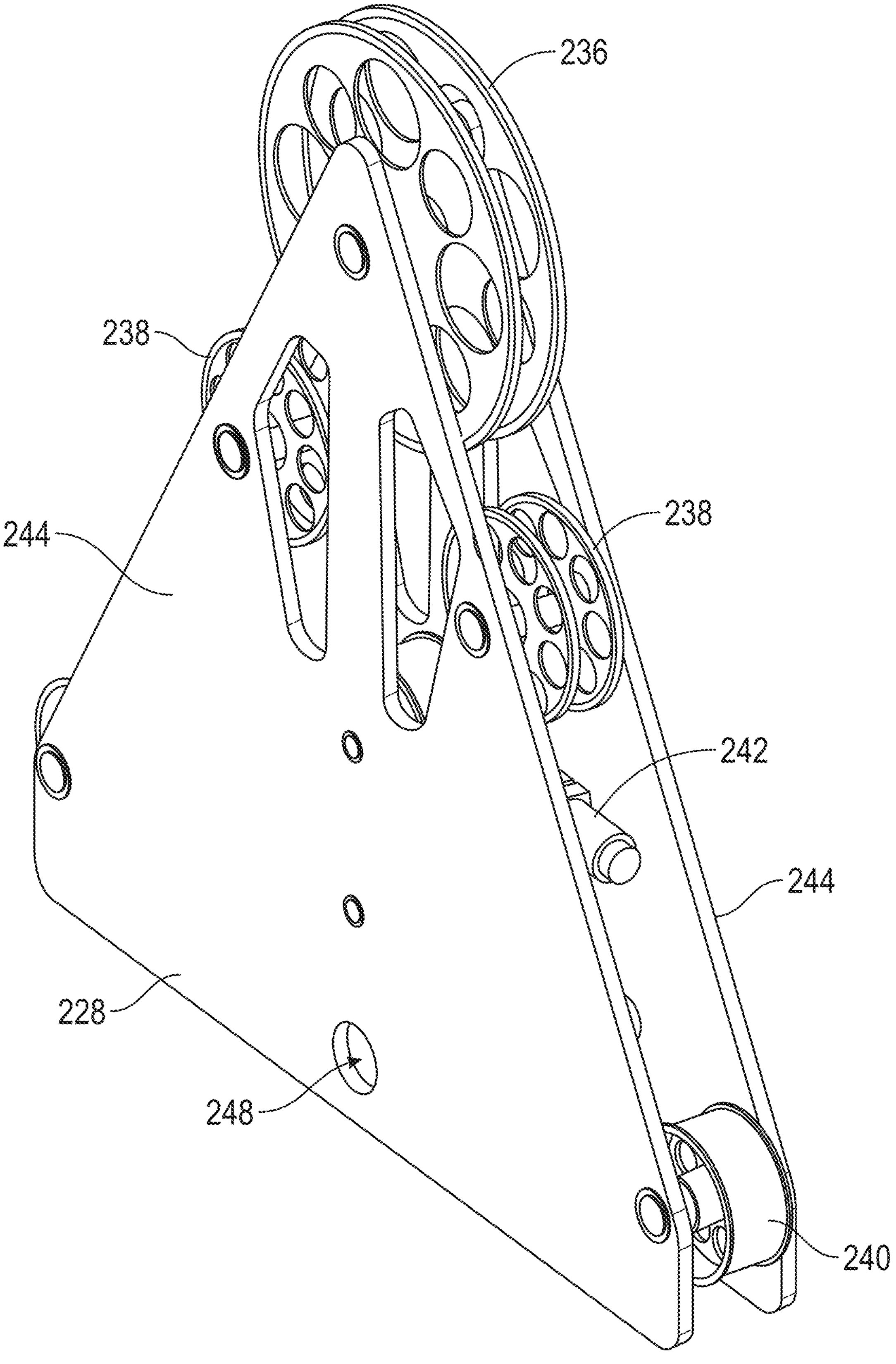
FIG. 2F is a perspective view of a pulley carriage and pulley system for the arm assembly of FIG. 2C.
Figure 2G:
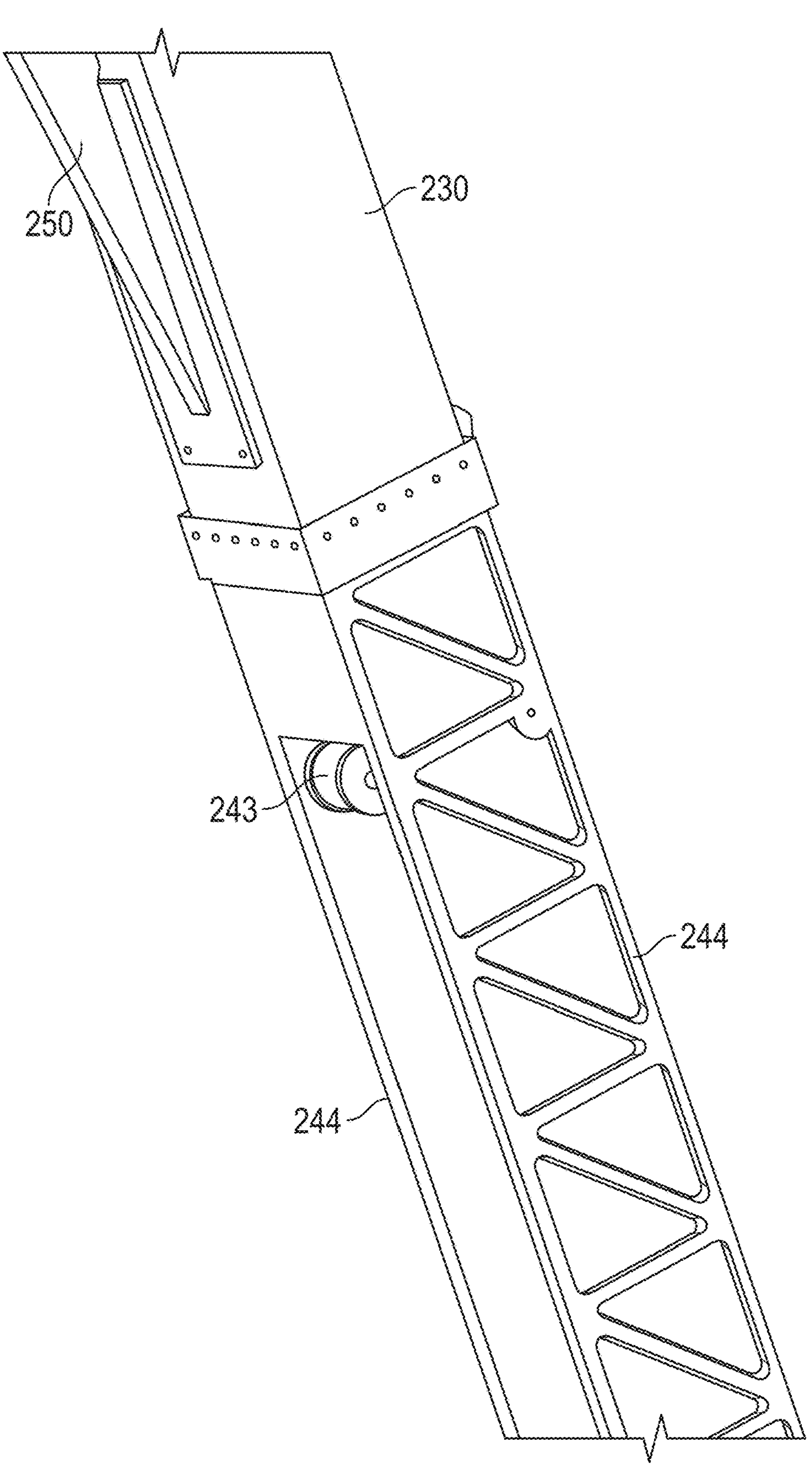
FIG. 2G is a perspective view of a portion of a support arm for the arm assembly of FIG. 2C in accordance with an embodiment.

In an embodiment shown in FIG. 2B and FIG. 2F, the carriage 228 is formed from a pair of opposing plates with the pulleys 236, 238, spools 240, and winch motor 242 disposed therebetween. In this embodiment, the main arm 230 may include a pair of opposing plates 244 that define a slot 246 (FIG. 2C) that is sized to receive the carriage 228. This arrangement provides advantages in allowing for the rotation of the main arm 230 within interfering with the operation of the pulleys 236, 238, spools 240, and winch motor 242. The plates 244 each include an opening 248 that cooperate with a pin extending through the carriage 228 to define the pivot 234. It should be appreciated that the main arm 230 may further include support arms 250 that angularly extend between the cross-arm 232 and a central portion of the main arm 230 to support the cross-arm 232.

In the illustrated embodiment, the main arm 230 is a generally hollow structure that is sized to receive linear-slide mechanism 218. In an embodiment, the linear-slide mechanism 218 includes a slide arm 252 with an end effector 254 disposed on one end. As will be discussed in more detail with respect to FIGS. 4A and 4B, the end effector may include a plurality of fingers that are moved between an opened and closed position by an actuator. In one embodiment, the end effector may include a modular interface that can detach with the payload cage after the cage is deployed to the surface. In an embodiment, the actuator may be a lead screw type mechanism.

The slide arm 252 is sized to be slidably received within the main arm 230 and is configured to be continuously moved between a retracted position (FIG. 2A) and an extended position (e.g. FIG. 2B) to allow the structure 114 to be lifted off the payload deck 110 and to provide clearance with the fuselage 102 and struts 108. In some embodiments, the extension of the slide arm 252 may further be adjusted to accommodate obstructions on the landing surface.

Figure 3:
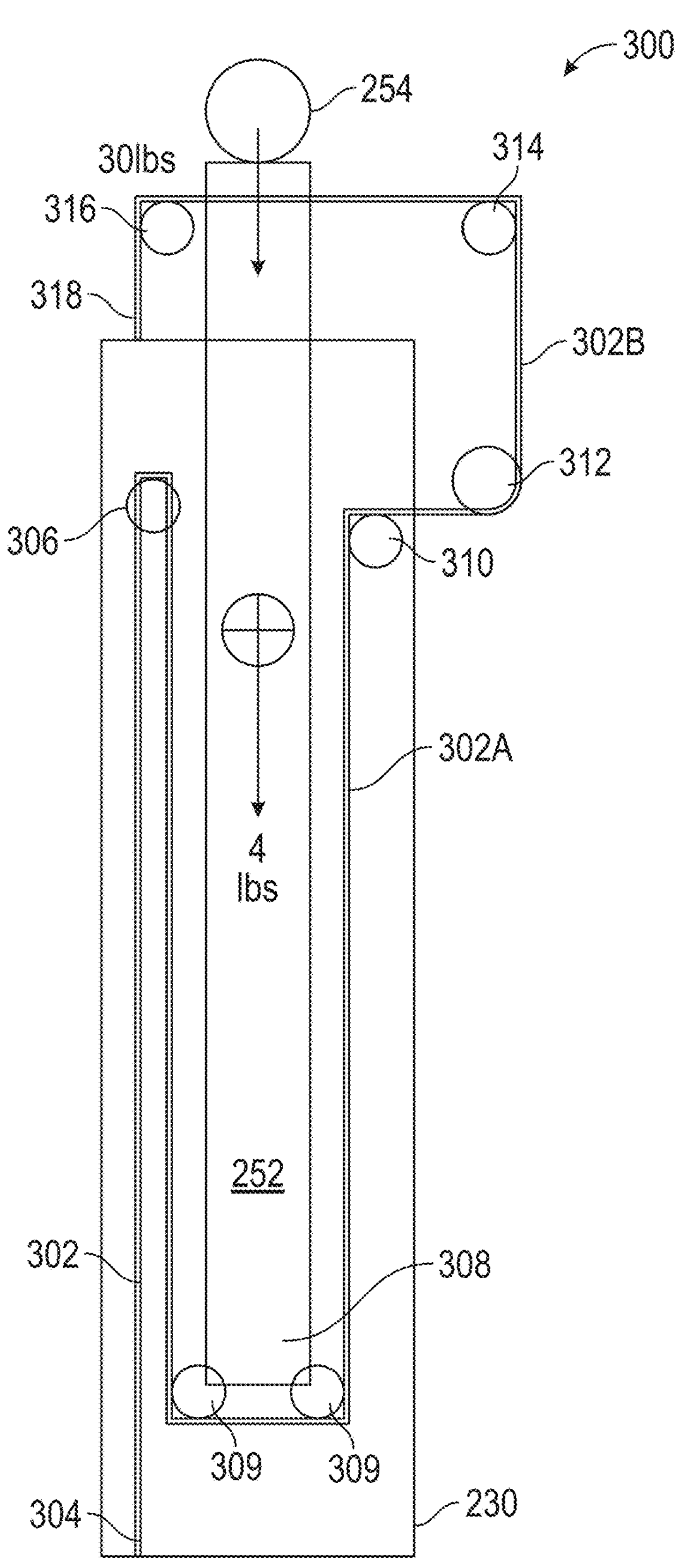
FIG. 3 is a schematic view of the cabling arrangement for the arm assembly of FIG. 2C.

In an embodiment, to actuate the slide arm 252, the linear-slide mechanism 218 includes a cable-pulley arrangement 300 as shown in FIG. 3, with continuing reference to FIGS. 2C-2E. In this embodiment, a cable 302 has a first end 304 that is operably coupled (e.g. fixed) to the main arm 230. The cable 302 is routed about a pulley 306 and then looped under an end 308 of the slide arm 252. In this embodiment, the slide arm 252 freely slides within the main arm 230. By looping the cable under the end 308, the slide arm will move in response to a shorting or lengthening of the cable 302. In an embodiment, one or more pulleys 309 are disposed on the end 308 to facilitate movement of the cable 302. After being looped under the end 308, the cable is routed over a pulley 310 to a capstan mechanism 312. The cable 302 exits the capstan mechanism 312 and is routed over a pulley 314. From the pulley 314, the cable 302 slidably engages the top of the slide arm 252 (e.g. the end adjacent the end effector. A final pulley 316 redirects the cable 302 back towards the main arm 230 where an end 318 is coupled to the end of the main arm.

In an embodiment, the capstan mechanism 312 is a revolving cylinder that is powered by an electric motor. The cable 302 is wrapped around the cylinder such that that the capstan mechanism 312 can simultaneously pull one portion 302A of the cable 302 while releasing or "unwinding" a second portion 302B of cable 302. It should be appreciated that as the capstan mechanism 312 pulls the cable portion 302A, this portion of the cable 302 becomes shorter as the cable portion 302A winds about the cylinder. In turn, the cable 302 translates or slides the slide arm 252 to extend the slide arm 252 from the main arm 230. It should be appreciated that as the cable portion 302A is wound onto the cylinder, a proportionate amount of cable portion 302B is unwound from the cylinder to allow the slide arm 252 to move. When it is desired to retract the slide arm 252 (e.g. shorten the effective length of the slide arm), then the capstan mechanism 312 is operated in reverse and pulls the cable portion 302B while unwinding the cable portion 302A.

Figure 4A:
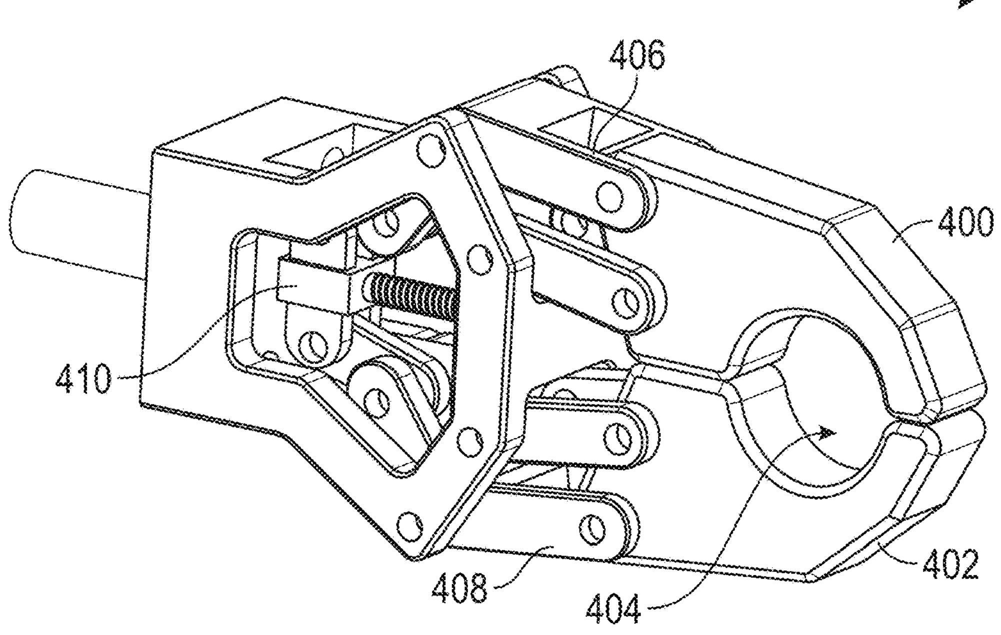
FIG. 4A and FIG. 4B are perspective views of an end effector for the arm assembly of FIG. 2C in accordance with an embodiment.
Figure 4B:
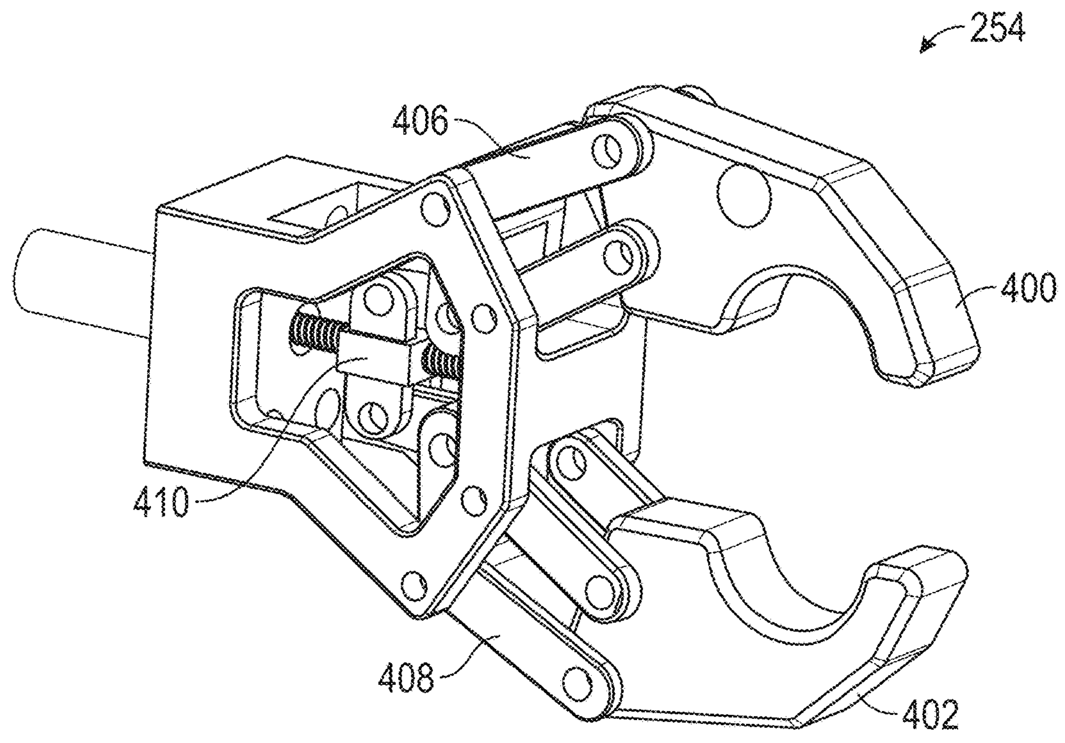

The slide arm 252 releasably engages the structure 114 through an end effector 254. Referring now to FIG. 4A and FIG. 4B, an embodiment is shown of an end effector 254 having a pair of moveable fingers 400, 402. In another embodiment, the function of the end effector 254 may be performed using another mechanism, such as a pin with a bearing surface or a non-pyrotechnic actuator, The fingers define an opening 404 when in the closed position (FIG. 4A) that is sized to engage an element on the structure 114. A set of linkages 406, 408 couple the finger 400, 402 to a lead screw 410. In response to the lead screw 410 moving from a first position (FIG. 4A) to a second position (FIG. 4B), the fingers 400, 402 rotate and translate into an open position. When in the open position, the end effector 254 is decoupled from the structure 114.

Figure 5A:
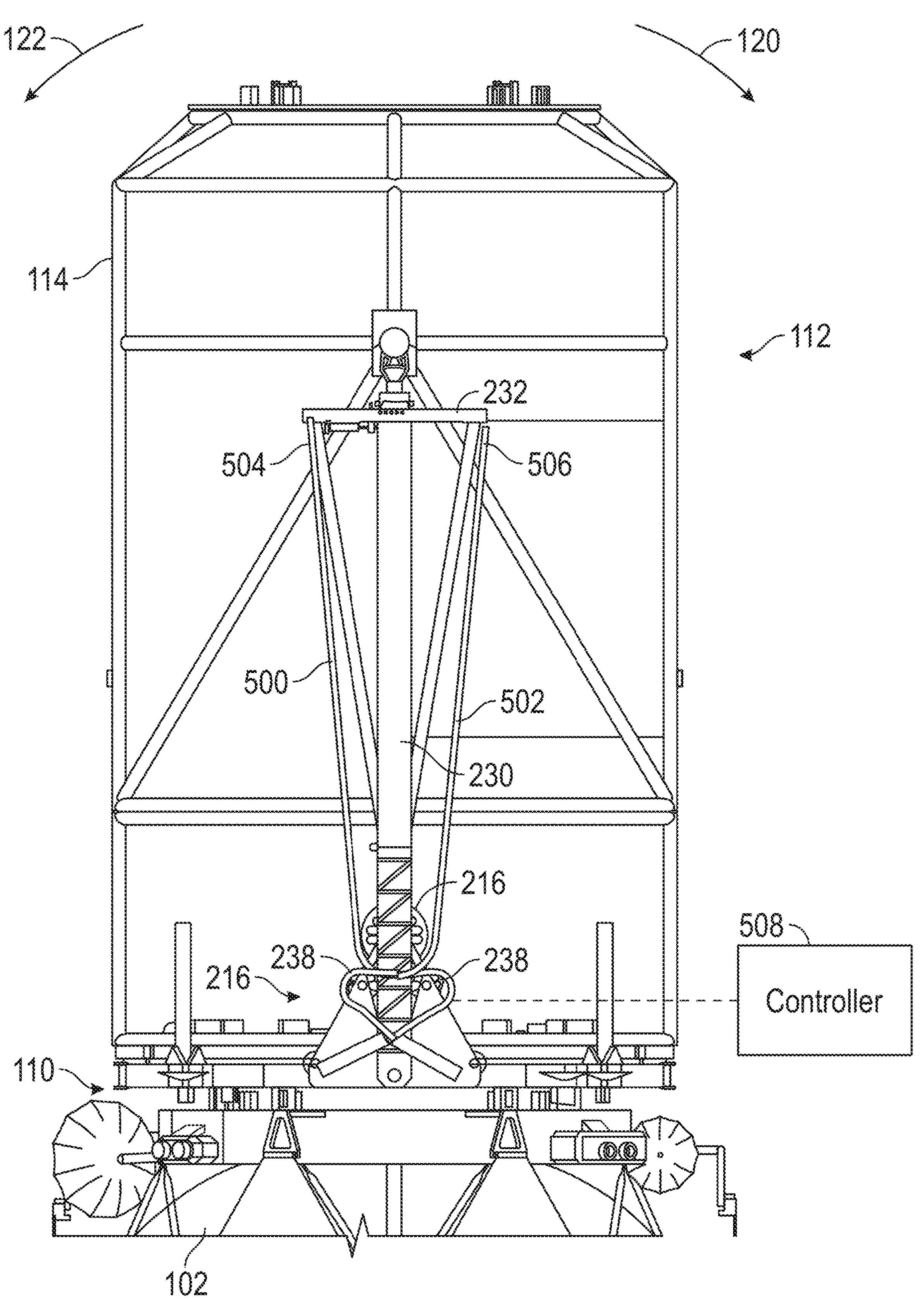
FIG. 5A, FIG. 5B, and FIG. 5C illustrate a method of operating the cargo unloading system in accordance with an embodiment.
Figure 5B:
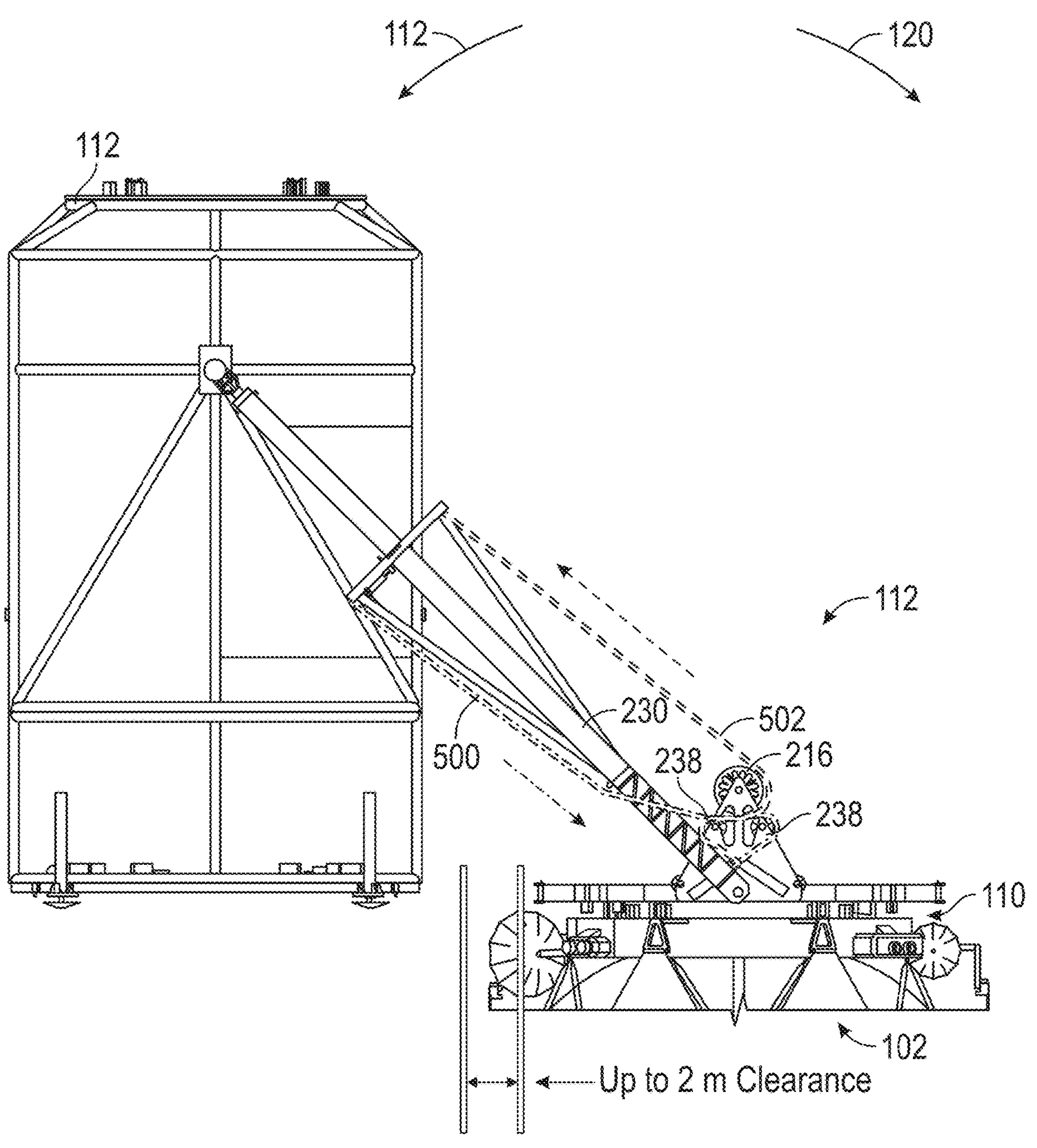
Figure 5C:
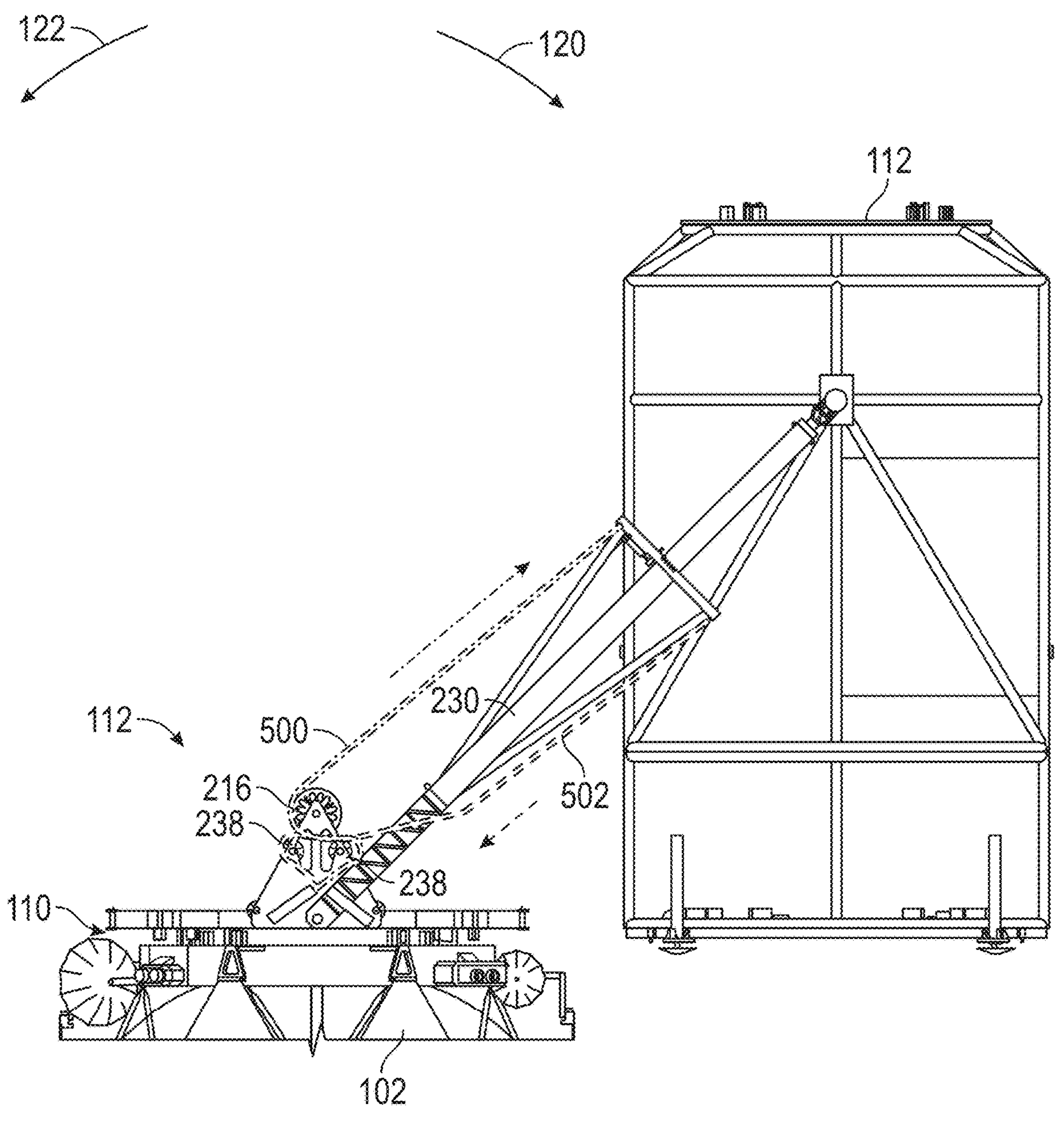

Referring now to FIG. 5A-5C, the configuration and operation of the bidirectional rotation mechanism 216 is shown. In this embodiment, the bidirectional rotation mechanism 216 includes a pair of belay cables 500, 502 that operate to control the position and direction of movement of the main arm 230. The cables 500, 502 are each coupled on an end 504, 506 respectively to opposite ends of the cross-arm 232. The cables 500, 502 then extend down to the carriage 228 and are routed about the pulley 236 and pulley 238 in a serpentine manner and are coupled to the winch motor 242 and spools 240. The winch motor 242 may be coupled to a controller 508 that allows the cables 500, 502 to be selectively pulled and released to allow rotation of the main arm 230. The controller 508 is further coupled to the capstan mechanism 312 (FIG. 2C) to control the position of the slide arm 252.

To operate the unloading assembly, the operator or controlling algorithm first decides which side of the fuselage 102 it is desired to lower the structure 214 from the payload deck 110, namely one of the directions indicated by arrows 120, 122. In the embodiment of FIG. 5B, it is desired to move the structure 114 in the direction of arrow 122. To accomplish this, the controller 508 first causes the slide arm 252 to extend to lift the structure 114 from the payload deck 110 and provide clearance. This may be accomplished by causing the capstan mechanism 312 to pull on the cable portion 302A causing the cable 302 to lift or translate the slide arm 252. Once a desired amount of clearance is generated, the controller 508 causes the winch motor 242 to pull on cable 500 and simultaneously release (in equal amounts) cable 502. This combined motion causes the main arm 230 to rotate in the direction of arrow 122. In an embodiment, the slide arm 252 and main arm 230 are sized to allow up to a 2 meter clearance between the edge of the structure 214 and the fuselage 102.

If it was desired to move the structure 114 in the direction of arrow 120, the process would be reversed once the slide arm 252 is extended to lift the structure from the payload deck 110. In this instance, the controller 508 causes the winch motor 242 to pull on the cable 502 and release the cable 500 in equal amounts. This results in the main arm 230 rotating in the direction of arrow 120.

It should be appreciated that the ability to unload cargo in two different directions provides advantages to the operators in providing flexibility in selecting the landing surface since they will still be able to unload the cargo in the event that features adjacent the landing surface (e.g. rocks, hills, craters) would inhibit the unloading process, the operator can unload the cargo off the opposite side.

Figure 6A:
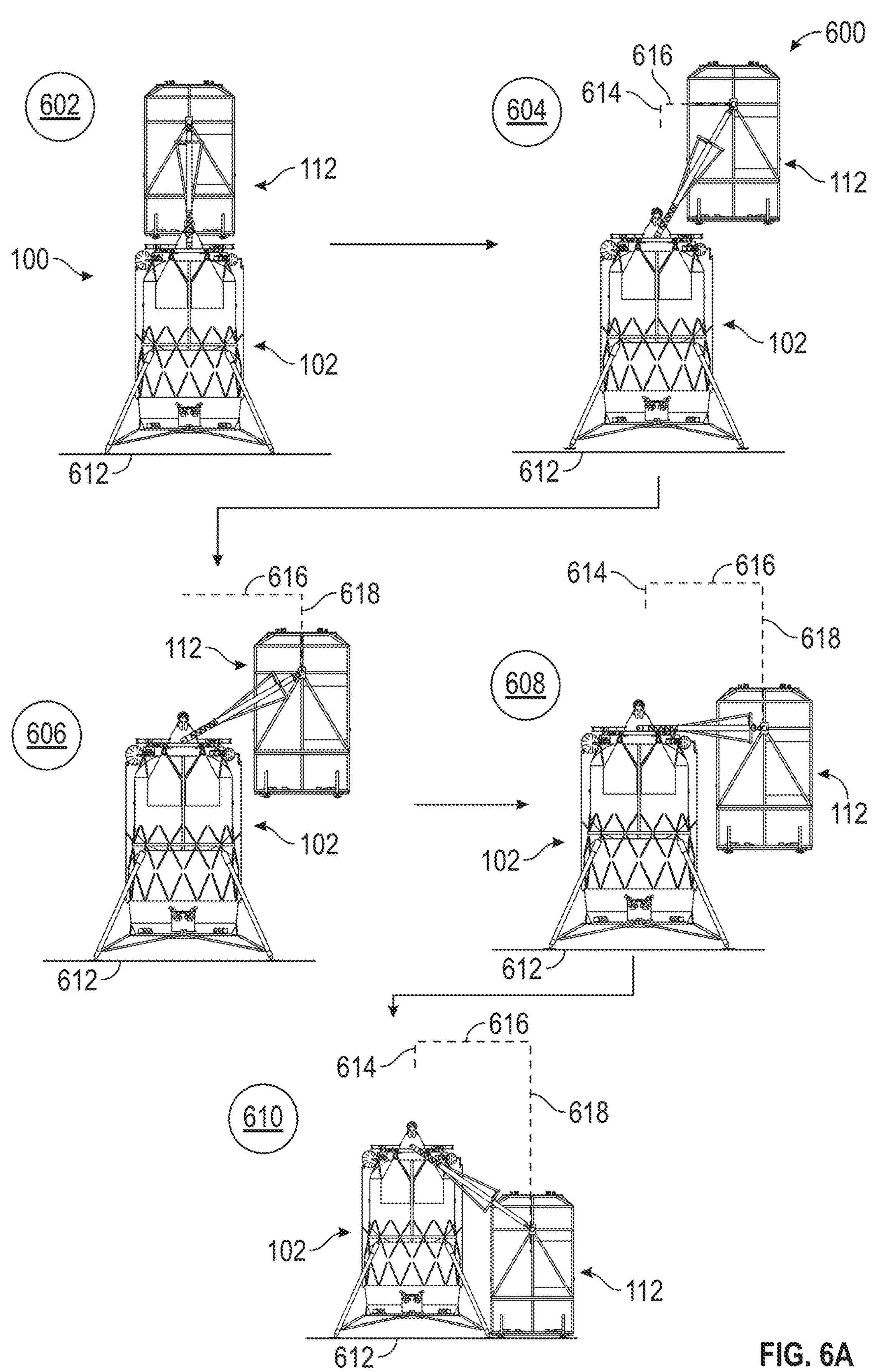
FIG. 6A and FIG. 6B illustrate a method of operating the cargo unloading system in accordance with another embodiment.
Figure 6B:
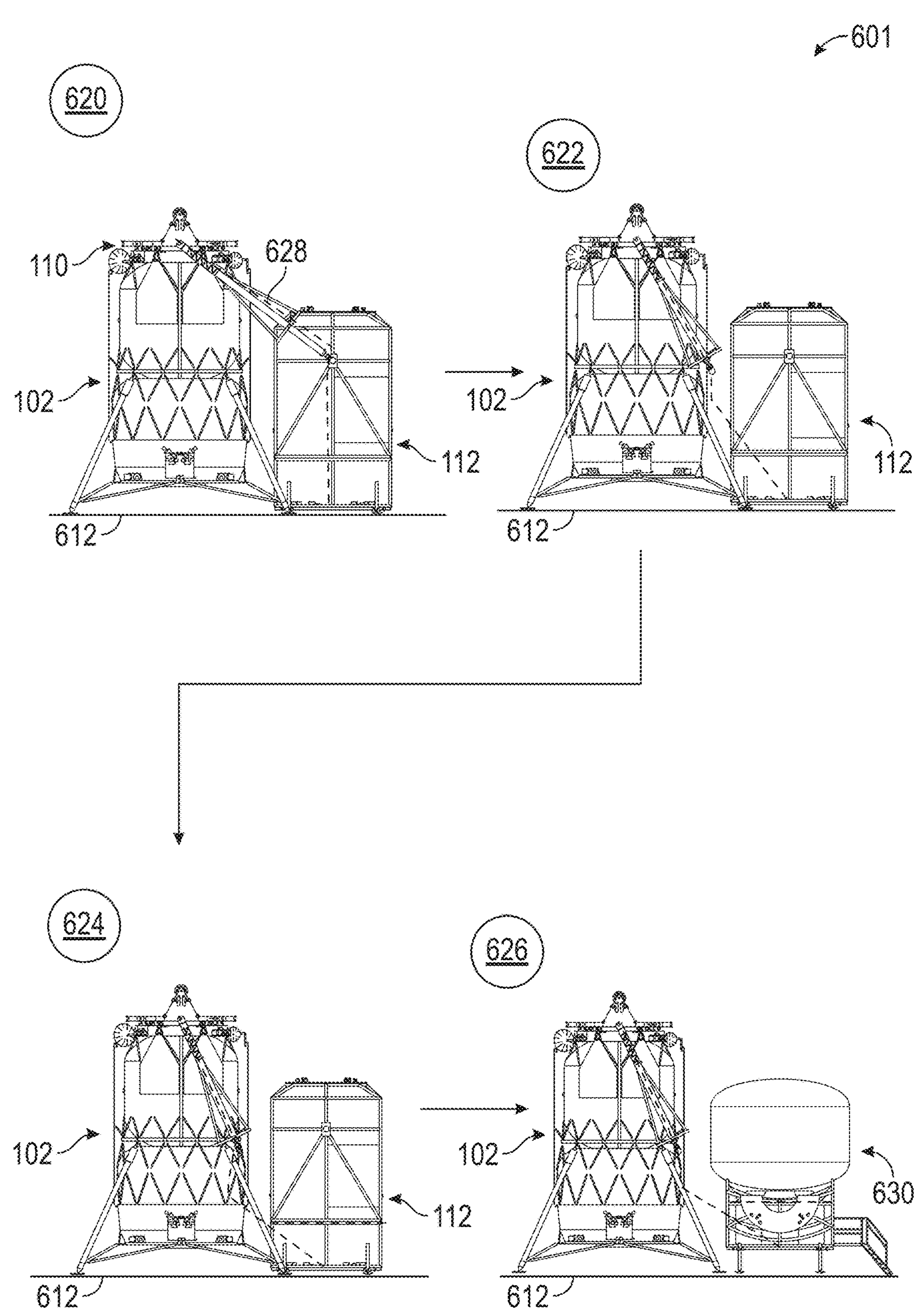

Referring now to FIG. 6A and FIG. 6B, a method 600 is shown for the process of unloading cargo from the payload deck 110. The method 600 starts at step 602 where the landing vehicle 100 lands on a landing surface 612 which the unloading assembly 112 arranged vertically above the fuselage 102 (relative to the landing surface). Once landed, the unloading process may begin. The method 600 then proceeds to step 604 where the unloading assembly 112 is activated by first lifting the structure 114 in a direction 614 by extending the slide arm 252 a sufficient amount to provide clearance when the main arm 230 is rotated in the desired direction 616.

The method 600 then proceeds to step 606 where the main arm 230 continues to rotate and the structure 114 starts to descend in a direction 618 toward the landing surface 612. The method 600 proceeds to step 608 where further rotation of the main arm 230 causes the structure 114 to continue in the direction 618 towards the landing surface 612. It should be appreciated that the slide arm 252 may be adjusted during steps 606, 608 to accommodate the fuselage 102, the struts 108, or debris/obstructions on the landing surface 612. Finally, in step 610, the main arm 230 is rotated a sufficient amount to place the structure 114 on the landing surface 612.

It should be appreciated that while lines 616, 618 indicating the path of travel of the unloading assembly 112 are illustrated as being linear/straight, this is for example purposes and the claims should not be so limited. In other embodiments, the unloading assembly 112 may follow different travel paths, such as a curved or arcuate travel path, a linear travel path, or a combination of the foregoing.

It should be appreciated that at this point, the operator may unload the cargo from structure 114. The method may optionally be reversed to place the structure 114 once again back on top of the payload deck 110. In an embodiment, shown in FIG. 6B, the fuselage 102 may remain connected to the cargo to provide power or other services, such as communication or life support systems for example. In the embodiment of FIG. 6B, the method 601 starts in step 620 with the structure 114 positioned on the landing surface 612. In this embodiment, a harness, cable or conduit 628 (commonly referred to an umbilical) extends between the payload deck 110 and the structure 114. The conduit 628 is supported by the main arm 230 and slide arm 252. With the structure 114 on the landing surface, the end effector 254 is disconnected from the structure 114 in step 622. This allows the main arm 230 to continue rotation to clear the main arm 230, slide arm 252 and end effector 254 from the structure 114. In an embodiment, the method 601 then proceeds to block 624 where the main arm 230 or the slide arm 252 are further adjusted to route the umbilical 628 away from any moving parts on the structure 114, such as a hinged door or cage for example.

With clearance provided between the umbilical 628 and any moving components on the structure 114, the cargo may be deployed, such as a habitat structure 630 for example, with services, such as power, communications, heating/cooling fluids, or water for example supplied to the habitat structure 630 via the umbilical 628.

In some embodiments, it may be desirable to relaunch the landing vehicle 100 after the cargo has been unloaded. However, due to the forces involved, it is undesired to have the main arm 230 unsecured. In an embodiment shown in FIG. 7, the fuselage 102 includes an element 700, such as a pin or an eyelet for example. In this embodiment, the main arm 230 is rotated and the slide arm 252 is adjusted to position the end effector 254 to engage the element 700. With the end effector 254 and element 700 engaged, the main arm 230 is secured to the fuselage 102. With the main arm 230 secured, the landing vehicle 100 may be relaunched without undesired movement by the unloading assembly 112.

Figure 7:
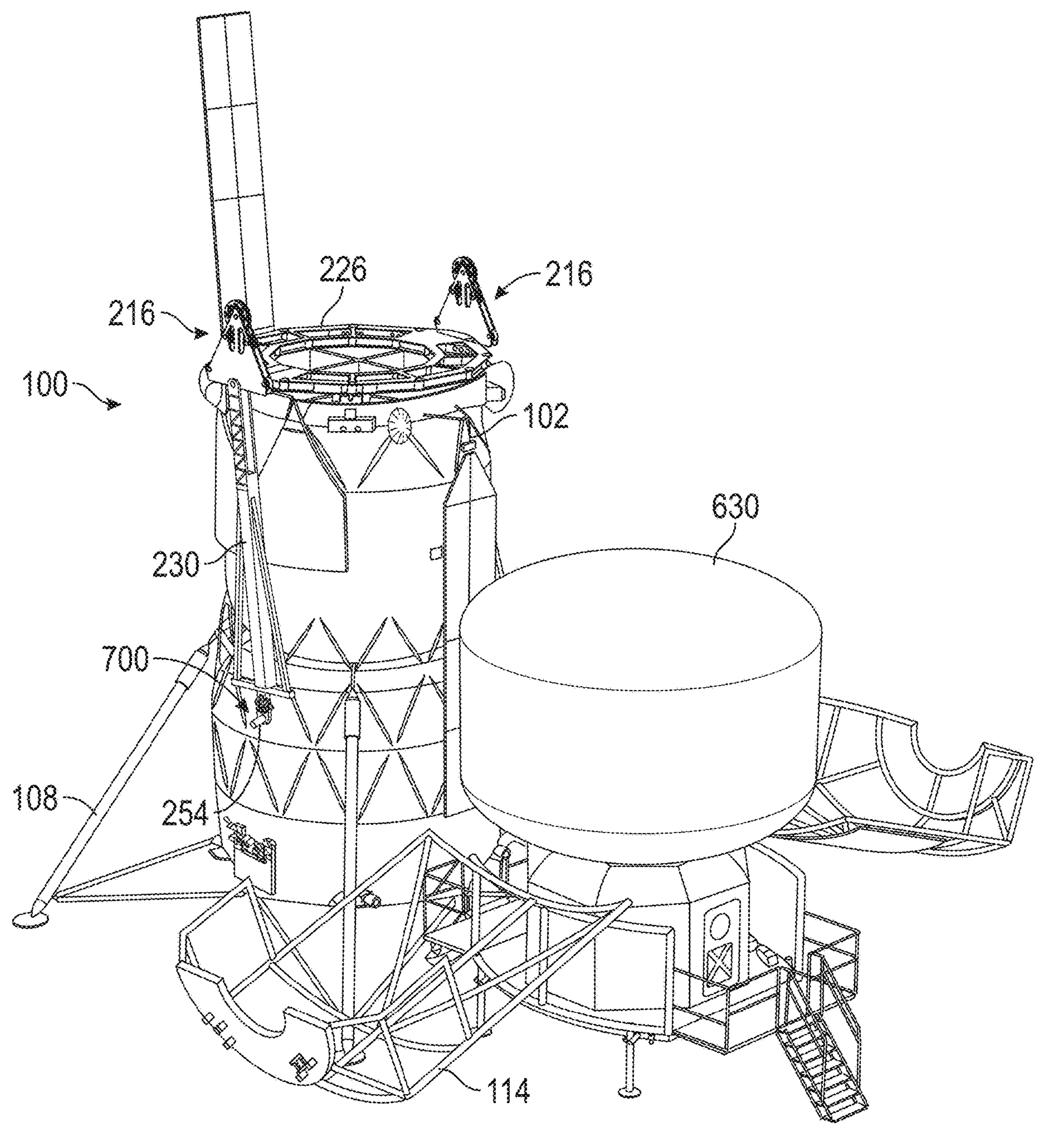
FIG. 7 is a perspective view of an aerospace landing vehicle with cargo unloading system secured for departure from the landing surface.
Figure 8:
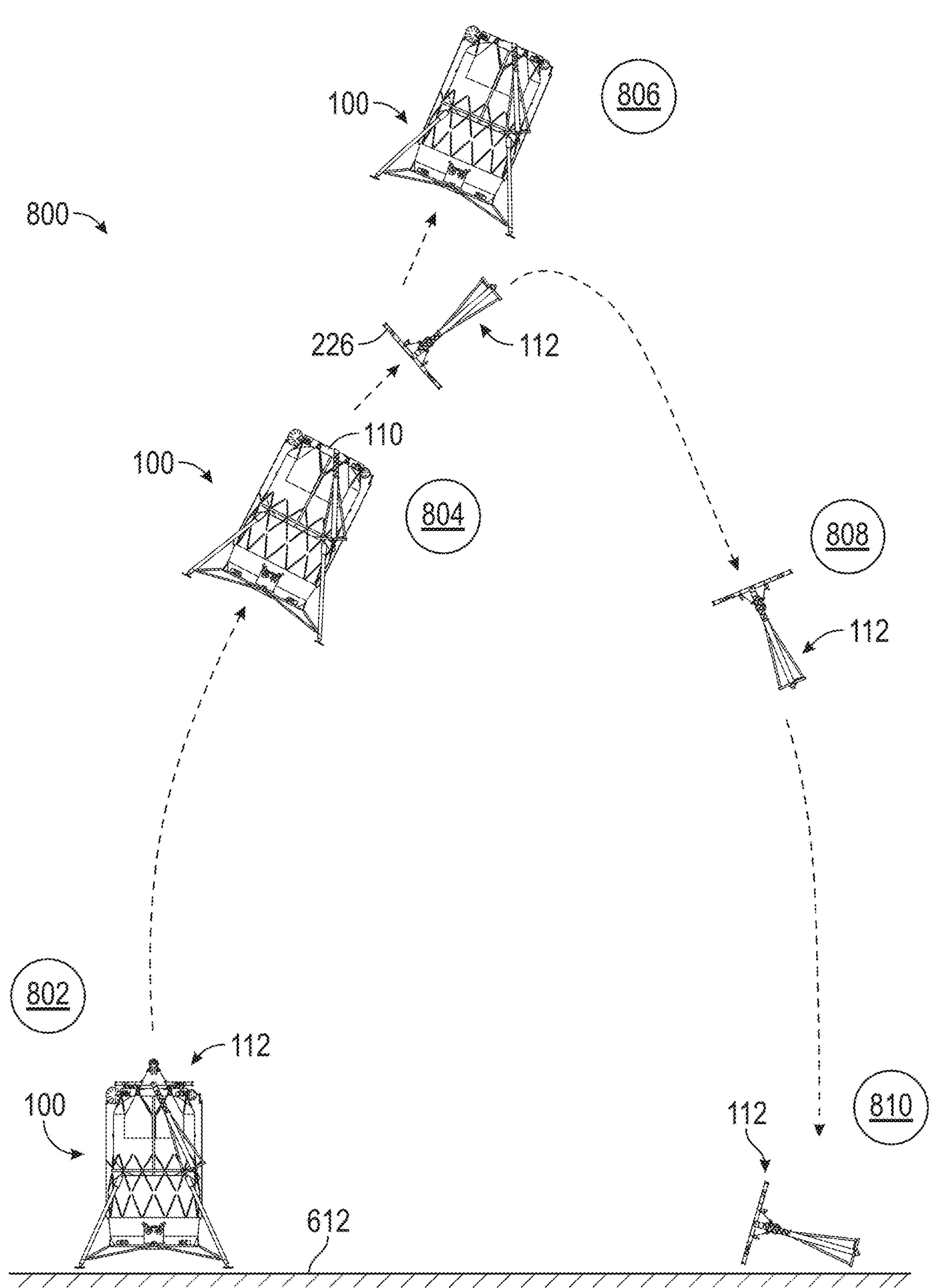
FIG. 8 is a schematic illustration of a method of launching the aerospace landing vehicle in accordance with another embodiment.

In some embodiments, it may be desirable to remove the unloading assembly 112 from the landing site, but not retain the unloading assembly for reuse. This may occur for example, when the cargo is packaged with the unloading assembly at an earlier point in time (e.g. an origination point) and intended to be a used a single time. Referring now to FIG. 8 a method 800 is shown for relaunching a vehicle 100 and discarding the unloading assembly 112. The method 800 starts in step 802 with the vehicle 100 on the landing surface 612 and unloading assembly 112 configured with the end effector 254 secured to the element 700 (FIG. 7). The vehicle 100 is then relaunched, such as using propulsion devices 106 for example, and the vehicle 100 gains altitude.

When the vehicle 100 is at a predetermined altitude and orientation, the pallet adapter 226 is separated from the payload deck 110 in step 804. In an embodiment, one or more stored energy devices (not shown) may be arranged to impart a separation force on the pallet adapter 226. With the unloading assembly 112 separated, the vehicle 100 proceeds along a desired trajectory in step 806. The unloading assembly 112 proceeds along a second trajectory in step 808 towards the surface 612. In step 810, the method ends with the unloading assembly 112 landing back on the surface 612.

It should be appreciated that while embodiments herein may refer to the use of the loading/unloading assembly with respect to a particular extraterrestrial location, such as the moon or lunar surface, this is for example purposes and the claims should not be so limited. In other embodiments, the loading/unloading assembly described herein may be used on other terrestrial or extraterrestrial bodies, such as but not limited to Mars for example. In still further embodiments, the loading/unloading assembly may be used on moons/satellite objects of other solar system planets, such as Titan or Europa for example.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It should also be noted that the terms "first", "second", "third", "upper", "lower", and the like may be used herein to modify various elements. These modifiers do not imply a spatial, sequential, or hierarchical order to the modified elements unless specifically stated.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An aerospace landing vehicle having cargo, the aerospace vehicle landing vehicle comprising:

a fuselage having a thruster disposed on a first end;

a payload deck on a second end opposite the first end;

a carriage configured to couple to the payload deck;

at least one main arm configured to be rotationally coupled to the carriage, the at least one main arm being in a first position when coupled to the cargo;

a linear-slide arm slidably coupled to a first end of the at least one main arm, the linear slide arm being in a retracted position when the cargo is disposed on the payload deck;

an end effector operably coupled to a second end of the linear-slide arm, the end effector being releasably coupled to the cargo; and a bi-directional rotation mechanism operably coupled between the carriage and the first end.

2. The system of claim 1, wherein the bidirectional rotation mechanism includes a first cable operably coupled to the first end;

a second cable operably coupled to the first end; and at least one winch motor operably coupled to at least one of the first cable or second cable, wherein the bidirectional rotation mechanism is configured to cause the main arm to pivot in response to the at least one winch motor pulling on one of the first cable or second cable.

3. The system of claim 2, further comprising a slide actuation mechanism coupled between the at least one main arm and the linear-slide arm.

4. The system of claim 3, wherein the slide actuation mechanism includes:

a third cable having a third end coupled to the main arm at the first end and a fourth end coupled to the main arm at a position offset from the first end;

a capstan coupled to the main arm and to the third cable; and wherein the third cable slidingly engages, and is operably coupled to, the linear-slide arm to bidirectionally translate the linear-slide arm in response to operation of the capstan.

5. The system of claim 1, further comprising an umbilical cable having a fifth end operably coupled to the aerospace landing vehicle and having an opposing sixth end configured to couple with a cargo, the umbilical cable being operably coupled to the linear slide arm.

6. The system of claim 5, wherein the umbilical cable is configured to transfer power and communications signals.

7. The system of claim 6, wherein the umbilical cable is further configured to transfer a fluid.

8. The system of claim 1, further comprising a pallet adapter coupled between the carriage and the aerospace landing vehicle.

9. The system of claim 8, wherein the pallet adapter is releasably coupled to the aerospace landing vehicle.

10. The aerospace landing vehicle of claim 1, further comprising a slide actuation mechanism coupled between the at least one main arm and the linear-slide arm.

11. The aerospace landing vehicle of claim 10, further comprising a controller operably coupled to the bi-directional rotation mechanism and the slide actuation mechanism.

12. The aerospace landing vehicle of claim 11, wherein the controller is operable to cause a selective rotation the main arm in a first rotational direction or a second rotational direction in response to an input.

13. The aerospace landing vehicle of claim 12, wherein the controller is further operable to cause a movement of the linear-slide arm from a retracted position to a first position prior to rotating the main arm.

14. The aerospace landing vehicle of claim 13, wherein the controller is further operable to cause the rotation of the main arm in the selected first rotational direction or second rotational direction to a second position where the cargo is resting on a landing surface.

15. The aerospace landing vehicle of claim 14, wherein the controller is further operable to cause decoupling of the end effector from the cargo when in the second position, and further cause rotation of the main arm to a third position.

16. The aerospace landing vehicle of claim 15, wherein the fuselage further includes a locking member, and the controller is further operable to couple the end effector to the locking member when in the third position.

17. The aerospace landing vehicle of claim 16, further comprising a pallet adapter coupled between the carriage and the payload deck, wherein the pallet adapter is releasably coupled to the payload deck.

18. The aerospace landing vehicle of claim 17, wherein the controller is further operable to:

cause the aerospace landing vehicle to launch from the landing surface;

cause the rotation of the at least one main arm to the first position after launching from the landing surface;

cause the decoupling of the pallet adapter from the payload deck in response to the aerospace landing vehicle being at a predetermined altitude or orientation; and cause the separation of the pallet adapter from the aerospace vehicle.

* * * * *